(12) United States Patent
Hofmann et al.

(10) Patent No.: US 12,358,100 B2
(45) Date of Patent: Jul. 15, 2025

(54) DEVICE AND METHOD FOR CONNECTING A COOLING NOZZLE TO A COOLING LUBRICANT SUPPLY

(71) Applicant: Schaeffler Technologies AG & Co. KG, Herzogenaurach (DE)

(72) Inventors: Klaus Hofmann, Höchstadt (DE); Florian Ganzmann, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 327 days.

(21) Appl. No.: 17/918,674

(22) PCT Filed: Feb. 24, 2021

(86) PCT No.: PCT/DE2021/100181
§ 371 (c)(1),
(2) Date: Oct. 13, 2022

(87) PCT Pub. No.: WO2021/209085
PCT Pub. Date: Oct. 21, 2021

(65) Prior Publication Data
US 2023/0087894 A1    Mar. 23, 2023

(30) Foreign Application Priority Data
Apr. 17, 2020   (DE) .................. 10 2020 110 477.4

(51) Int. Cl.
*B24B 55/02*   (2006.01)
*B05B 15/65*   (2018.01)

(52) U.S. Cl.
CPC .............. *B24B 55/02* (2013.01); *B05B 15/65* (2018.02)

(58) Field of Classification Search
CPC ..... B24B 41/005; B24B 53/095; B24B 55/02; B24B 57/02; B23Q 11/10; B23Q 11/1023;
(Continued)

(56) References Cited

U.S. PATENT DOCUMENTS 5,947,531 A    9/1999   Eckard et al.
8,936,207 B2 *  1/2015   Swan ................ B05B 15/40
                                                    239/589
(Continued)

FOREIGN PATENT DOCUMENTS

CN    2920569 Y    7/2007
CN    201253933 Y    6/2009
(Continued)

OTHER PUBLICATIONS

Author: Alle Rechte BEI JMC GMBH Source: Standard KSS Düsen Schnellwechselsystem—Construction with similar properties (https://jcm-gmbh.ch/jcm-tooltec-gmbh-lengnau.shtml) Date: Jan. 4, 2008 Country: Germany.

*Primary Examiner* — Robert F Neibaur

(57) ABSTRACT

A device for connecting a cooling nozzle to a cooling lubricant supply for a grinding machine includes a central axis, a housing arranged for receiving the cooling nozzle, a rotary-linear transmission and a tube section. The rotary-linear transmission has a drive element, pivotable about the central axis, and a manual lever fixed to the drive element. The tube section is rotationally fixed in the housing and movable along the central axis by the rotary-linear transmission to be pressed against the cooling nozzle. The rotary-linear transmission may be a self-locking transmission. The drive element may have a thread structure which extends over less than a full revolution.

12 Claims, 4 Drawing Sheets

(58) Field of Classification Search
CPC ............. B23Q 11/103; B23Q 11/1084; B23Q 2250/12; B05B 15/65; F16L 37/0941; F16L 37/252; F16L 37/107; F16L 37/24; F16L 37/248
USPC .................................................. 451/450, 53
See application file for complete search history.

(56) References Cited

U.S. PATENT DOCUMENTS

| | | | |
|---|---|---|---|
| 9,004,982 B2* | 4/2015 | Salomon | ................ B24B 27/08 451/449 |
| 11,154,884 B2* | 10/2021 | Hayward | .............. B05B 7/2408 |
| 2004/0050450 A1 | 3/2004 | Lambert et al. | |
| 2015/0001844 A1 | 1/2015 | Tiberghien et al. | |
| 2018/0023600 A1 | 1/2018 | Komazawa et al. | |

FOREIGN PATENT DOCUMENTS

| | | |
|---|---|---|
| CN | 101947375 A | 1/2011 |
| CN | 102029549 A | 4/2011 |
| CN | 106385132 A | 2/2017 |
| DE | 1113389 B | 8/1961 |
| DE | 1137650 B | 10/1962 |
| EP | 1475186 A1 | 9/2005 |

* cited by examiner

DEVICE AND METHOD FOR CONNECTING A COOLING NOZZLE TO A COOLING LUBRICANT SUPPLY

CROSS-REFERENCE TO RELATED APPLICATIONS

This application is the United States National Phase of PCT Appln. No. PCT/DE2021/100181 filed Feb. 24, 2021, which claims priority to German Application No. DE102020110477.4 filed Apr. 17, 2020, the entire disclosures of which are incorporated by reference herein.

TECHNICAL FIELD

The present disclosure relates to a device and a method for connecting a cooling nozzle to a cooling lubricant supply of a grinding machine, e.g., for internal cylindrical grinding.

BACKGROUND

A device for supplying lubricant and coolant when grinding workpieces is described in DE 1 113 389 B, for example. The lubricant and coolant is supplied with the aid of a nozzle, the width of which at the outlet is approximately the same as the width of the grinding wheel. According to DE 1 113 389 B, the nozzle should be arranged in order to generate pressure in the grinding gap in such a way that the jet of liquid is directed precisely at the grinding point and the nozzle reaches so far up to the grinding point in the grinding gap that the circumference of the grinding wheel and the circumference of the workpiece there is an extension of the nozzle towards the grinding point.

DE 1 137 650 B discloses an attachment for bore grinding. Here, in addition to a pneumatic drive for tool rotation, a pressure medium drive is provided for axial alternating movements of the grinding unit.

EP 1 475 186 B1 discloses a device for cylindrical grinding which, in addition to a grinding wheel, includes an auxiliary abrasive tool which rotates about an auxiliary tool axis. With the aid of this device, it should be possible to process different workpiece surfaces between which a circular transition edge is formed.

SUMMARY

A connection device suitable for use in a grinding machine, e.g., for internal cylindrical grinding, includes a rotary-linear transmission which has a drive element which can be pivoted about a central axis and which is connected to a manual lever. The rotary-linear transmission also has a tube section as an output element that can be displaced along the aforementioned central axis in a housing and is secured against rotation. A receiving means for a cooling nozzle is formed by the housing, onto which the tube section can be pressed by means of the rotary-linear transmission.

The disclosed device considers that a cooling nozzle for supplying cooling lubricant to the grinding point of a grinding machine must be adjusted during the set-up process. The time required for this process is not available for the actual grinding work.

The connection device according to the application not only offers the possibility of changing a cooling nozzle quickly, but is also suitable for the precise positioning of a cooling nozzle that has already been preset in the connection device. Periods in which the grinding machine. e.g., an internal cylindrical grinding machine, is not available for grinding are thus minimized.

The rotary-linear transmission, with which the tube section provided for the passage of cooling lubricant is displaced within the connection device without rotating it, can be designed as a self-locking transmission. This means that the manual lever cannot be deflected from the output side of the transmission, i.e., by a force acting on the tube section in the longitudinal direction.

In particular, this means that the tube section, as soon as it clamps the cooling nozzle by being pressed against it, remains in this position without further fixing means; for example, in the form of a clamping screw. A single movement of the hand is therefore sufficient to establish a fluidic connection between the tube section and the cooling nozzle and at the same time to fix the cooling nozzle in the connection device. The only prerequisite for this connection process is the insertion of the cooling nozzle into the housing receiving means, which can also be done with a single movement.

The rotary-linear transmission is designed to convert a rotational movement of the drive element—regardless of the direction of rotation—in a defined manner into a longitudinal movement of the output element. There is thus a clear correlation between the angular position of the drive element and the position of the output element both when the output element is displaced in a first axial direction, i.e., in the longitudinal direction of the output element, and when the output element is displaced in the opposite axial direction. In this way, a linear forced guidance of the driven element in both axial directions, controlled exclusively by the drive element, is realized.

In general, the cooling nozzle is connected to a cooling lubricant supply of a grinding machine, and the cooling nozzle is supported on a receiving means of a stationary housing and secured against rotation. A tube section, provided for the passage of cooling lubricant, is linearly guided in the housing, secured against rotation, and pressed against the cooling nozzle with the aid of a manually operated rotary-linear transmission arranged in the housing.

According to one possible method, the cooling nozzle is mounted in a preset configuration on the housing fixed to the grinding machine, and the rotary-linear transmission is actuated with the aid of a manual lever which can be pivoted through less than 180° and is firmly connected to a drive element of the rotary-linear transmission. The manual lever remains connected to the drive element during operation of the grinding machine, including the supply of cooling lubricant. The drive element retains its position exclusively by frictional locking, namely by the self-locking design of the rotary-linear transmission.

To connect the cooling nozzle and to release the connection between the connection device and the cooling nozzle, a pivoting movement of the manual lever is sufficient, which can be carried out without the user changing their grip. The drive element of the rotary-linear transmission can accordingly have a thread structure which extends over significantly less than a full revolution, e.g., over less than half a revolution. For example, the thread structure is designed as a multiple thread, and each thread extends over less than 180°.

A multiple thread structure can, for example, be formed by helically wound links, into each of which engages a guide pin which is firmly connected to the tube section and at the same time is supported in the housing in the circumferential direction of the tube section. The guide pins thus have a dual function, namely, a function as elements of a thread mechanism and, in cooperation with the housing, a function to prevent rotation.

The receiving means for the cooling nozzle formed by the connection device can have two guide jaws which laterally engage around the cooling nozzle and which allow the cooling nozzle to be displaced exclusively orthogonally to the central axis of the tube section. The cooling nozzle, which is to be attached to the connection device, can be constructed in one or more parts. In both cases, the largest part of the cooling nozzle attached to the connection device typically protrudes from the connection device. There are no fundamental restrictions with regard to the material from which the cooling nozzle is made. It is also possible to manufacture the cooling nozzle from a mix of different materials; for example, plastic and metal.

In order to support correct positioning of the cooling nozzle on the connection device, a stop limiting the displacement of the cooling nozzle can be arranged on at least one of the guide jaws. Alternatively, such a stop can be attached to a housing section of the stop device between the guide jaws. In addition to a stop, the connection device can have a latching device that fixes the cooling nozzle in its stop position. Such a latching device includes, for example, an element which is spring-mounted in the housing of the connection device and which can latch into a latching contour on the side of the cooling nozzle.

BRIEF DESCRIPTION OF THE DRAWINGS

Two exemplary embodiments are explained in more detail below with reference to drawings. In the drawings.

DETAILED DESCRIPTION

Unless otherwise stated, the following explanations relate to both exemplary embodiments. Corresponding or basically identical parts are marked with the same reference symbols in all figures.

Figure 5:
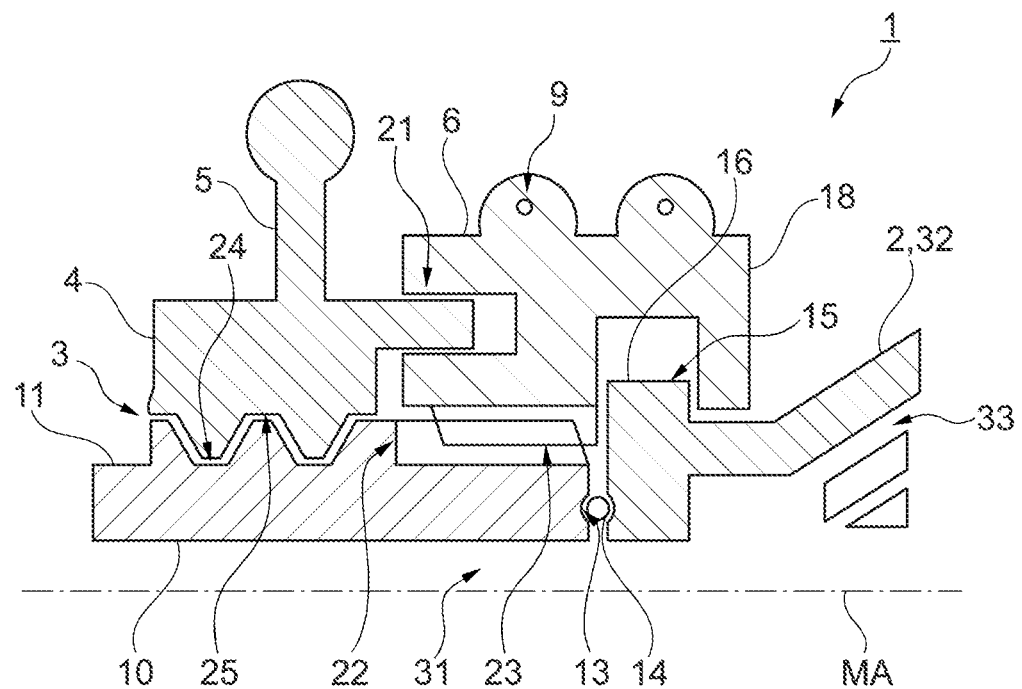
FIG. 5 shows a second exemplary embodiment of a connection device including a cooling nozzle in a schematic sectional view.

A device identified overall by the reference symbol 1 is provided for connecting a cooling nozzle 2 to a cooling lubricant supply of a grinding machine, namely an internal cylindrical grinding machine. Part of the connection device 1 is a rotary-linear transmission 3, i.e., a transmission which converts a rotation into a linear movement. A link ring is provided as the limited rotatable drive element 4 of the rotary-linear transmission 3 in the exemplary embodiment according to FIG. 1, and a spindle nut is provided in the exemplary embodiment according to FIG. 5. In any case, a manual lever 5, which can be pivoted about the central axis, designated MA (ref. FIG. 5), of the connection device 1, i.e., a pivoted lever, is firmly connected to the drive element 4. The drive element 4 itself has the basic shape of a ring, which is arranged concentrically to the central axis MA.

The drive element 4 is rotatably mounted in a housing 6 of the connection device 1. A housing cover is designated 7 and a housing base 8. Fastening contours of the housing 6 are designated 9. The housing 6 is rigidly connected to the supporting structure of the grinding machine.

A tube section 10, which is located centrally in the housing 6, is provided for the passage of cooling lubricant during operation of the grinding machine. A hose through which cooling lubricant is supplied can be connected to a connecting portion 11 of the tube section 10 protruding from the housing 6. The end face of the tube section 10 opposite the connecting portion 11 is referred to as the nozzle-side end face 12. In the nozzle-side end face 12 there is a groove 13 which is suitable for inserting a seal 14 (ref. FIG. 5). With the aid of the seal 14 a liquid-tight seal between the tube section 10 and the cooling nozzle 2 is produced. The seal 14 contacts a base plate 16 of the cooling nozzle 2, and the base plate 16 is accommodated in a receiving means 15 of the connection device 1. Otherwise, the cooling nozzle 2 protrudes from the connection device 1.

A cooling lubricant channel 31 formed by the tube section 10 continues into the cooling nozzle 2, where it splits into individual channels 33 in a distribution section 32 (ref. FIG. 5). As indicated in FIG. 5, the distribution section 32 can be connected in one piece to the rest of the cooling nozzle 2 including the base plate 16. Deviating from this, in the exemplary embodiment according to FIG. 1, in which only the base plate 16 of the cooling nozzle 2 is visible, the cooling nozzle 2 has a multi-part structure.

For the operation of the grinding machine, the cooling nozzle 2 must be adapted to the local conditions or selected from a plurality of available cooling nozzles 2. In any case, a quick change of the cooling nozzle 2 without adjustment work when the cooling nozzle 2 is installed on the grinding machine is advantageous from the point of view of the best possible usage of the grinding machine, i.e., maximizing the machine usage time. This aim is achieved in that the base plate 16 of the cooling nozzle 2 can be pushed into the receiving means 15 of the connection device 1 in a simple manner and enables the cooling nozzle 2 to be connected to the cooling lubricant supply.

Figure 3:
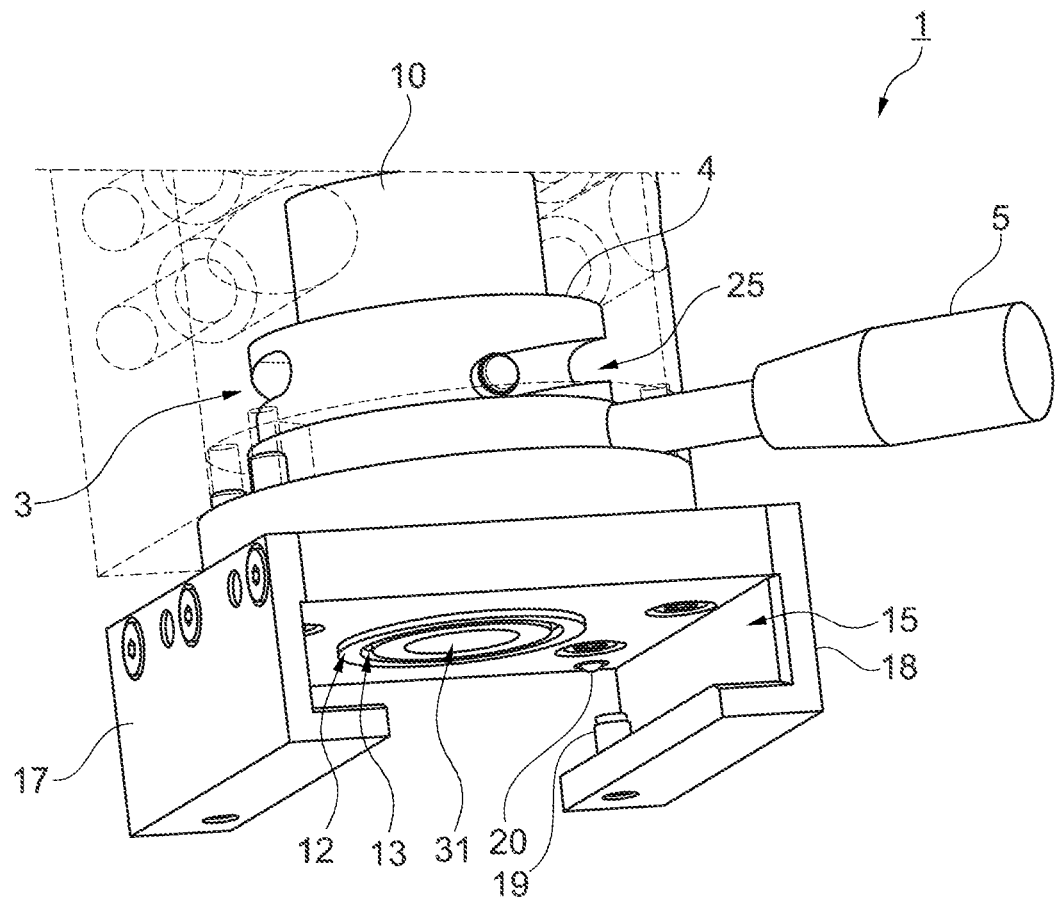
FIG. 3 shows a detail view of the connection device according to FIG. 1.

The receiving means 15 comprises two guide jaws 17, 18, which are attributable to the housing 6. The base plate 16 pushed completely into the receiving means 15 bears against a stop element 19 (ref. FIG. 3) which is provided by a guide jaw 17, 18 in the exemplary embodiments or is formed directly by the guide jaw 17, 18. In the stop position of the base plate 16, a latching device 20 (ref. FIG. 3), which is located on the housing floor 8, engages in a correspondingly shaped counter-contour of the base plate 16.

As shown in FIG. 5, a rotary bearing 21 is provided in the housing 6 for the rotatable but non-displaceable bearing of the drive element 4. In contrast to the drive element 4, the tube section 10, which is also referred to as the pressure head and represents the output element of the rotary-linear transmission 3, is mounted in the housing 6 so as to be exclusively displaceable with the aid of a linear bearing 22. An anti-rotation contour formed by the housing 6, which prevents any rotation of the tube section 10 about its own axis, i.e., about the central axis MA, is designated 23. Only in the exemplary embodiment according to FIG. 5 does the tube section 10 have an external thread 24 which interacts directly with a thread structure 25 of the drive element 4.

In the exemplary embodiment according to FIGS. 1 to 4, the thread structure 25 is embodied by links 28 which are located in the drive element 4. In this case, two diametrically opposite links 28 each represent a section of a thread path.

Figure 4:
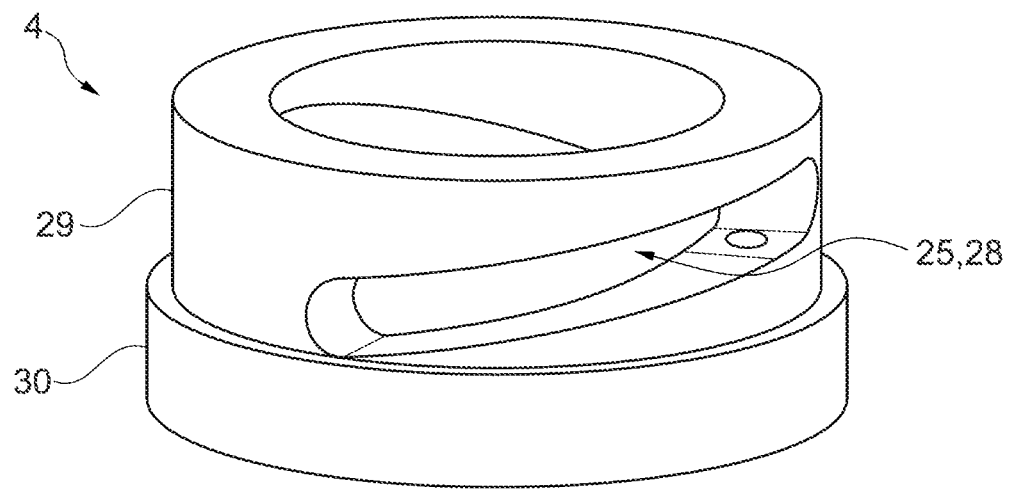
FIG. 4 shows a drive element of the connection device according to FIG. 1.

The thread structure 25 of the drive element 4 according to FIG. 4 is thus designed as a two-start thread.

Figure 1:
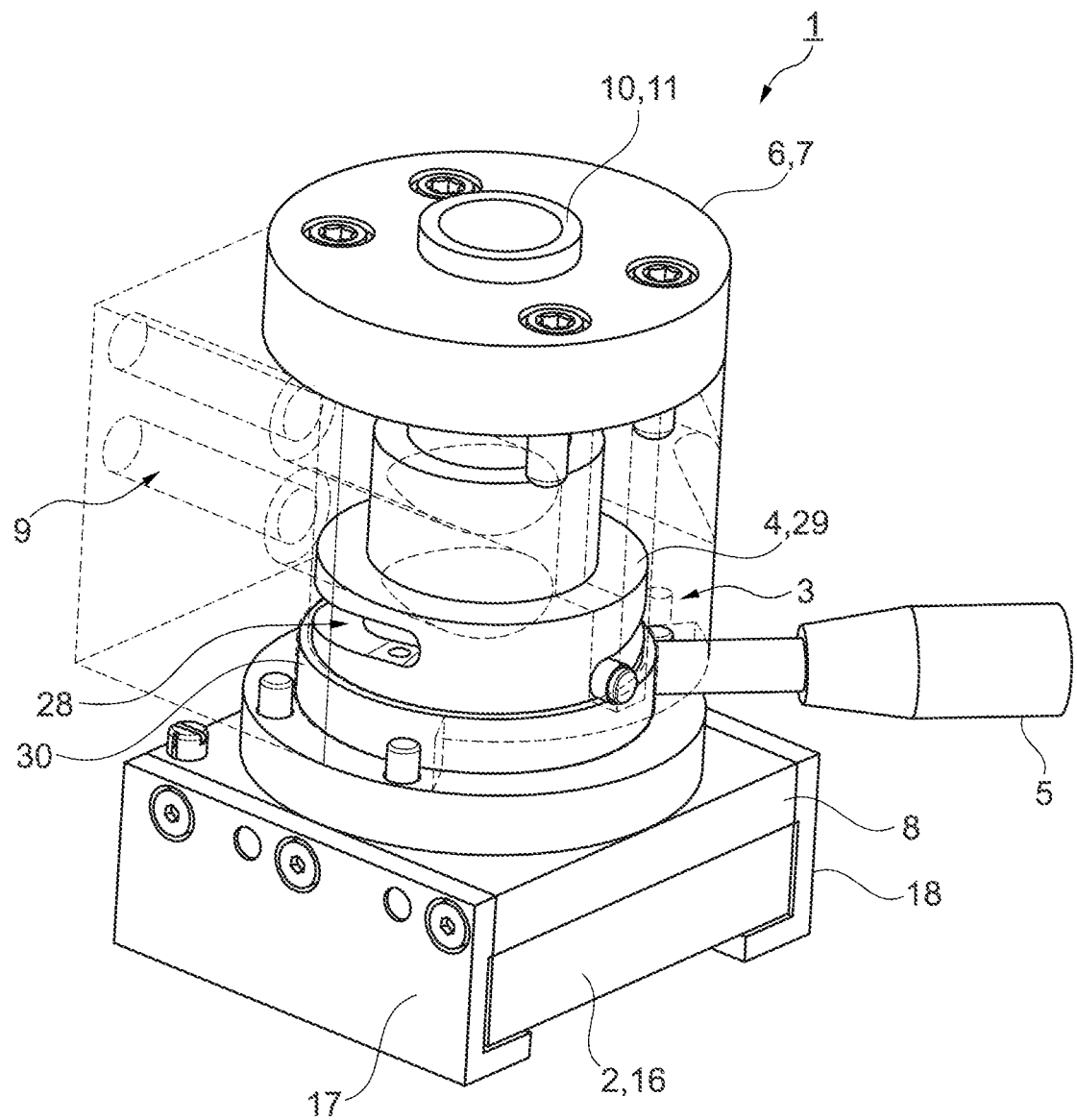
FIG. 1 shows a perspective view of a first exemplary embodiment of a connection device for a cooling nozzle of a grinding machine.
Figure 2:
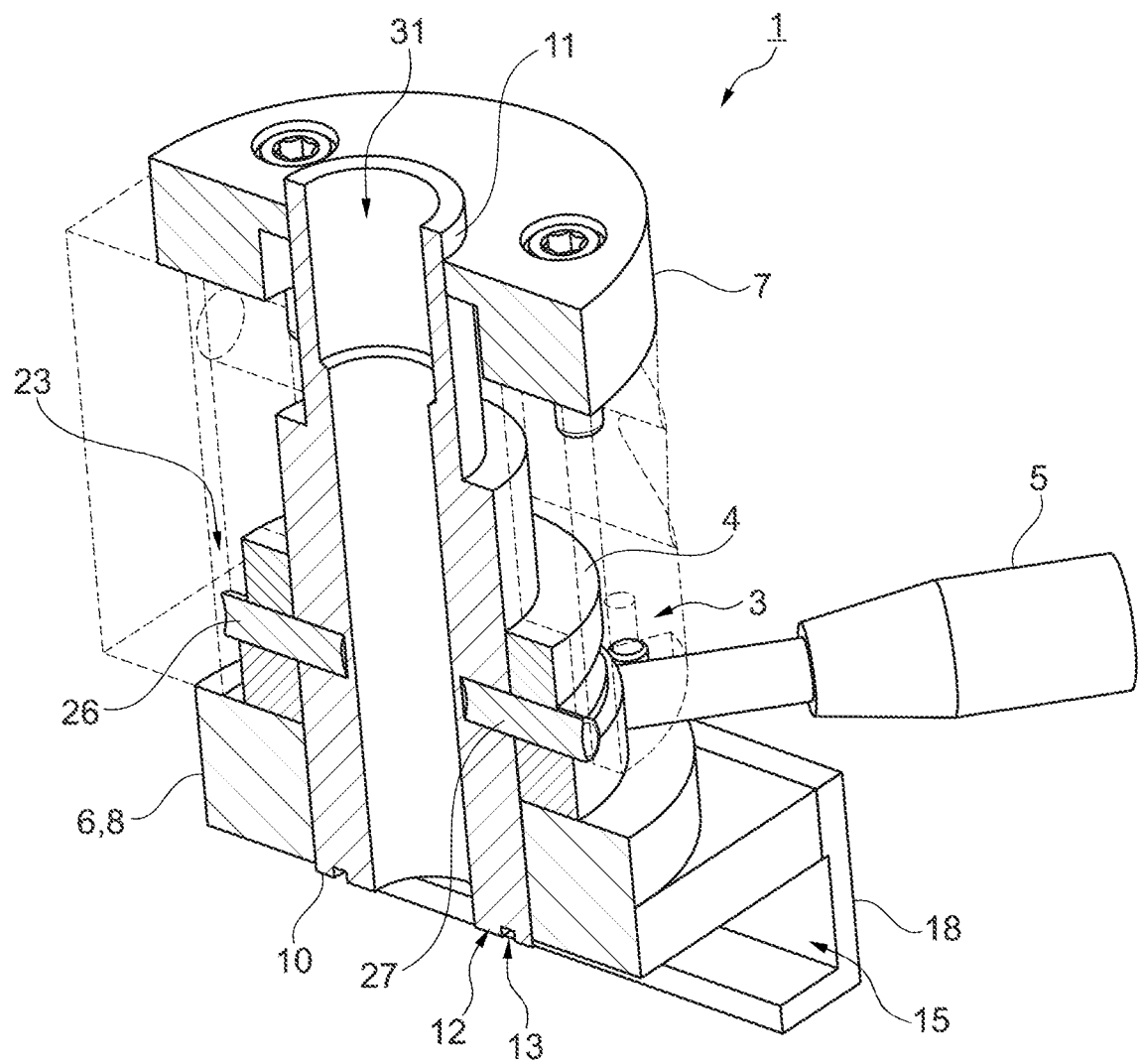
FIG. 2 shows the connection device according to FIG. 1 in a perspective view.

The function of the external thread 24 in the exemplary embodiment according to FIG. 5 is taken over in the exemplary embodiment according to FIG. 1 by two guide pins 26, 27, which are inserted into the tube section 10 and engage in the links 28 of the drive element 4, wherein the guide pins 26, 27 simultaneously function as anti-rotation elements cooperating with the anti-rotation contour 23 of the housing 6. As can be seen from FIG. 4, the links 28 are located in a thin-walled section 29 of the drive element 4. In this case, a foot portion 30 of the drive element 4 with thicker walls rests on the housing base 8.

In both exemplary embodiments, by pivoting the manual lever 5 by significantly less than 180°, the tube section 10 can either be pressed against the base plate 16 of the cooling nozzle 2 or lifted off the base plate 16 so far that the cooling nozzle 2 can be removed from the receiving means 15 with a single movement of the hand. Means for blocking the manual lever 5 in any position are not provided. The rotary-linear transmission 3 is designed as a self-locking transmission so that, for example, when the cooling nozzle 2 is inserted into the connection device 1, the manual lever 5 remains in its set position, in which a liquid-tight connection is established between the connection device 1 and the cooling nozzle 2. This also applies under vibration loads, which occur during operation of the grinding machine, which is supplied with cooling lubricant via the connection device 1.

REFERENCE NUMERALS

1 Connection device
2 Cooling nozzle
3 Rotary-linear transmission
4 Drive element, link ring
5 Manual lever
6 Housing
7 Housing cover
8 Housing base
9 Fastening contour of the housing
10 Tube section, pressure head
11 Connecting portion of the tube section
12 Nozzle-side end face of the tube section
13 Groove
14 Seal
15 Receiving means for the cooling nozzle
16 Base plate of the cooling nozzle
17 Guide jaw
18 Guide jaw
19 Stop element
20 Latching device
21 Rotary bearing of the drive element
22 Linear bearing of the tube section
23 Anti-rotation contour of the housing
24 External thread of the tube section
25 Thread structure of the drive element
26 Guide pin
27 Guide pin
28 Link, thread path
29 Thin-walled section of the drive element
30 Foot portion of the drive element
31 Cooling lubricant channel
32 Distribution section of the cooling nozzle
33 Single channel
MA Central axis

The invention claimed is:

1. A device for connecting a cooling nozzle to a cooling lubricant supply for a grinding machine, comprising
a housing;
a rotary-linear transmission that comprises a drive element which can pivot about a central axis and which is connected to a manual lever;
a tube section as an output element that can be moved along the central axis and is secured against rotation in the housing; and
a pair of guide jaws:
formed by the housing;
extending exclusively orthogonal to the central axis; and
arranged to engage the cooling nozzle to restrict displacement of the cooling nozzle to be exclusively orthogonal to the central axis, wherein the tube section can be pressed against the cooling nozzle by means of the rotary linear transmission.

2. The device according to claim 1, wherein the rotary-linear transmission is designed as a self-locking transmission.

3. The device according to claim 1, wherein the drive element of the rotary-linear transmission has a thread structure which extends over less than a full revolution.

4. The device according to claim 3, wherein the thread structure is designed as a multiple thread, wherein each thread extends over less than 180°.

5. The device according to claim 4, wherein the thread structure of the drive element is formed by helically wound links, into each of which a guide pin which is firmly connected to the tube section and at the same time is supported in the housing in a circumferential direction of the tube section.

6. The device according to claim 1, wherein a stop element limiting displacement of the cooling nozzle is attached to at least one of the guide jaws.

7. A device for connecting a cooling nozzle to a cooling lubricant supply for a grinding machine, comprising
a central axis;
a housing arranged for receiving the cooling nozzle, the housing comprising a rectangular housing base;
a rotary-linear transmission comprising:
a drive element, pivotable about the central axis; and
a manual lever fixed to the drive element;
a tube section, rotationally fixed in the housing and movable along the central axis by the rotary-linear transmission to be pressed against the cooling nozzle; and
two L-shaped guide jaws:
fixed to the housing base;
extending orthogonal to the central axis; and
arranged to receive the cooling nozzle therebetween to restrict axial displacement of the cooling nozzle away from the tube section.

8. The device of claim 7, wherein the rotary-linear transmission is a self-locking transmission.

9. The device of claim 8, wherein the drive element comprises a thread structure which extends over less than a full revolution.

10. The device of claim 9, wherein:
the thread structure comprises multiple threads; and
each one of the multiple threads extends over less than 180°.

11. The device of claim 10 further comprising multiple guide pins, wherein:
   the thread structure is formed by multiple helically wound links; and
   each one of the multiple guide pins is:
      fixed in the tube section;
      rotationally fixed in the housing; and
      engaged with a one of the multiple helically wound links.

12. The device of claim 7 wherein a one of the guide jaws comprises a stop element that limits displacement of the cooling nozzle.

\* \* \* \* \*